(12) United States Patent
Talukdar et al.

(10) Patent No.: US 10,986,552 B2
(45) Date of Patent: Apr. 20, 2021

(54) CONNECTION ESTABLISHMENT IN A 5G RADIO ACCESS NETWORK

(71) Applicant: Nokia Technologies Oy, Espoo (FI)

(72) Inventors: Anup Talukdar, Glendale Heights, IL (US); Mark Cudak, Rolling Meadows, IL (US); Ahmad Awada, Munich (DE)

(73) Assignee: Nokia Technologies Oy, Espoo (FI)

( * ) Notice: Subject to any disclaimer, the term of this patent is extended or adjusted under 35 U.S.C. 154(b) by 415 days.

(21) Appl. No.: 16/303,175

(22) PCT Filed: May 25, 2016

(86) PCT No.: PCT/US2016/034029
§ 371 (c)(1),
(2) Date: Nov. 20, 2018

(87) PCT Pub. No.: WO2017/204790
PCT Pub. Date: Nov. 30, 2017

(65) Prior Publication Data
US 2020/0329414 A1    Oct. 15, 2020

(51) Int. Cl.
*H04W 4/00*    (2018.01)
*H04W 36/28*    (2009.01)
*H04W 76/15*    (2018.01)
*H04W 36/08*    (2009.01)

(52) U.S. Cl.
CPC .......... *H04W 36/28* (2013.01); *H04W 36/08* (2013.01); *H04W 76/15* (2018.02)

(58) Field of Classification Search
CPC ...... H04W 36/28; H04W 76/15; H04W 36/08
USPC .......................................... 370/331; 455/412
See application file for complete search history.

(56) References Cited

U.S. PATENT DOCUMENTS

| | | | |
|---|---|---|---|
| 8,483,168 B2 | 7/2013 | Ji et al. | 370/329 |
| 2009/0262681 A1 | 10/2009 | Park et al. | 370/328 |
| 2010/0265928 A1 | 10/2010 | Peng et al. | 370/338 |
| 2013/0301455 A1 | 11/2013 | Jung | 370/252 |
| 2014/0219248 A1 | 8/2014 | Reddiboyana et al. | 370/331 |

(Continued)

OTHER PUBLICATIONS

3GPP TR 36.819 V11.2.0 (Sep. 2013), "3rd Generation Partnership Project; Technical Specification Group Radio Access Network; Coordinated multi-point operation for LTE physical layer aspects (Release 11)" 70 pgs.

(Continued)

*Primary Examiner* — Marcos Batista
(74) *Attorney, Agent, or Firm* — Harrington & Smith

(57) ABSTRACT

To establish a multi-AP RRC connection with a user device UD the UD in the coverage area of multiple APs selects suitable ones as cluster set candidates and reports this list to a temporary serving AP the UD chooses. The multi-AP connection itself is setup by the cluster set manager CSM. The CSM collects information from each AP about control channels and load in order to choose which APs will be in the cluster, which will be the serving AP, and to setup the multi-AP connection with the UD. Multiple message exchanges are described for this purpose. Once the multi-AP connection is established, if the UD's connection with the serving AP fails the UD can handover to another AP of the cluster set without having to re-establish a new RRC connection. This is particularly useful for networks subject to severe shadowing effects such as mmWave 5G.

15 Claims, 8 Drawing Sheets

(56) References Cited

U.S. PATENT DOCUMENTS

| | | | |
|---|---|---|---|
| 2015/0049681 A1* | 2/2015 | Huang | H04W 72/1289 |
| | | | 370/329 |
| 2015/0056997 A1 | 2/2015 | Su et al. | 455/436 |
| 2015/0201368 A1 | 7/2015 | Cudak et al. | H04W 48/08 |
| 2016/0066222 A1 | 3/2016 | Makinen et al. | H04W 36/0027 |
| 2017/0019903 A1 | 1/2017 | Talukdar et al. | |

OTHER PUBLICATIONS

3GPP TR 36.842 V12.0.0 (Dec. 2013), "$3^{rd}$ Generation Partnership Project; Technical Specification Group Radio Access Network; Study on Small Cell enhancements for E-UTRA and E-UTRAN; Higher layer aspects (Release 12)", 71 pgs.

Cudak, Mark, et al., "Moving Towards Mmwave-Based Beyond 4G (B-4G) Technology", 2013, IEEE $77^{th}$ Vehicular Technology Conference, abstract, 1 pg.

Talukdar, Anup K., et al., "Handoff Rates for Millimeterwave 5G Systems", 2014, IEEE $79^{th}$ Vehicular Technology Conference, abstract, 1 pg.

\* cited by examiner

CONNECTION ESTABLISHMENT IN A 5G RADIO ACCESS NETWORK

This patent application is a U.S. National Stage application of International Patent Application Number PCT/US2016/034029 filed May 25, 2016, which is hereby incorporated by reference in its entirety.

TECHNOLOGICAL FIELD

The described invention relates to wireless communications, and more particularly to the establishment of a wireless connection between a user device (UD) and a radio access network characterized by a lack of robustness such as observed in line-of-sight (LOS) type radio communication characteristics. These characteristics are prevalent for millimeter-wave (mmWave) spectrum for which 5G radio access technology (RAT) is being developed.

BACKGROUND

The continuing need to transfer larger volumes of data wirelessly to larger numbers of mobile users drives adaptations of existing radio access technologies as well as the development of new ones. One such new development is the $5^{th}$ Generation (5G) wireless networks which are being designed to deliver peak data rates of the order of ~10 Gbps (gigabits per second) with target latency requirements on the order of ~1 msec in order to serve applications with ultra-low latency performance requirements. Rather than utilizing spectrum that has been used for traditional cellular bands, 5G seeks to exploit the availability of large blocks of contiguous spectrum of the order of GHz or more in the millimeter-wave (mmWave) band; see for example M. Cudak, A. Ghosh, T. Kovarik, R. Ratasuk, T. Thomas, F. Vook and P. Moorut, "MOVING TOWARDS MMWAVE-BASED BEYOND-4G (B-4G) TECHNOLOGY," (*Proc. IEEE VTC-Spring* 2013, Jun. 2-5, 2013).

The mmWave bands allow for multi-element antenna arrays composed of very small elements, on the order of integrated-circuit (IC) chip scales, which can provide a large antenna gain and sufficient power output through over-the-air power combining, so as to help to compensate for the severe path loss characteristics in this band. This combination of large bandwidths and novel device architectures allows mmWave cellular to provide peak rates on the order of 10 Gbps and ample capacity to meet future demands.

However the propagation characteristics in the mmWave band are more challenging than traditional cellular frequencies. Diffraction at mmWave bands is effectively non-existent and propagation behaves similar to visible light. Transmission through most objects is diminished to the extent that foliage and other common obstacles can produce severe shadowing. The severe shadowing loss characteristics in the mmWave band implies that, the radio link between a user device (UD) and its serving AP will be disrupted if the line of sight (LOS) is blocked by obstacles, such as trees, pedestrians or trucks in an urban deployment scenario, as further detailed at A. Talukdar, M. Cudak and A. Ghosh, "HANDOFF RATES FOR MILLIMETERWAVE 5G SYSTEMS" (*Proc. IEEE VTC-Spring* 2014, May 18-21, 2014). Other types of LOS blocking may even be caused by user motions such as hand or body rotations. In order to deliver reliable connectivity to a user in presence of obstacles, a mmWave access point (AP) network is built with enough redundancies of APs such that in the event of a LOS blocking, the network connection of the user device (UD) can be rapidly rerouted via another AP.

FIG. 1 is a conceptual diagram of a typical 5G radio environment for a UD. Each UD in a mmWave network is served by a cluster of APs, called its cluster set. Further detail on the 5G cluster set can be seen at co-owned U.S. patent application Ser. No. 14/597,970 (filed on Jan. 15, 2015) concerning cluster set management. Members of the UD's cluster set are generally selected based on the accessibility of the APs from the UD. Among the APs in the cluster set, one particular AP can be selected as the serving AP for the UD, through which the network communicates with the UD, while other APs in the set are designated as stand-by APs. The UD maintains continuous connectivity with each member of its cluster set by maintaining synchronization with the symbol and frame structure, downlink (DL) and uplink (UL) control channels, and the UD also maintains beam synchronization by selecting the best beams for DL and UL communication.

The cluster set of a UD is configured and managed by the Cluster Set Manager (CSM); there is a logical instance of the CSM for each UD in the network. The location of the CSM should be close to the APs in the cluster set to enable low-latency communication with those APs and the UD. In FIG. 1 the cluster set for the illustrated UD contains three APs and the CSM for this UD is shown as being co-located with one of those APs.

Other relevant background references include:
- 3GPP TR 36.819 version 11.2.0, "COORDINATED MULTI-POINT OPERATION FOR LTE PHYSICAL LAYER ASPECTS (Release 11)";
- 3GPP TR 36.842: "STUDY ON SMALL CELL ENHANCEMENTS FOR E-UTRA AND E-UTRAN; HIGHER LAYER ASPECTS," V12.0.0, December 2013; and
- Co-owned U.S. patent application Ser. No. 14/800,211 (filed Jul. 15, 2015).

Embodiments of these teachings are directed to reducing service interruptions in wireless radio environments such as the 5G environment above where severe shadowing loss of the wireless channel is expected to occur frequently and with short notice.

SUMMARY

In a first embodiment of these teachings there is a method comprising: establishing a multi-access point connection between a user device and multiple access points of which one is a serving access point; and; in response to interruption of the connection between the user device and the serving access point, the user device handing over to a different one of the multiple access points using the established multi-access point connection such that the different one of the multiple access points becomes a new serving access point.

In a second embodiment of these teachings there is a computer readable memory tangibly storing a computer program that when executed causes a host user device to establish a multi-access point connection between a user device and multiple access points of which one is a serving access point; and; in response to interruption of the connection between the user device and the serving access point, the user device handing over to a different one of the multiple access points using the established multi-access point connection such that the different one of the multiple access points becomes a new serving access point.

In a third embodiment of these teachings there is an apparatus comprising at least one processor and at least one memory storing a computer program. In this embodiment the at least one processor is configured with the at least one memory and the computer program to cause the apparatus to perform actions comprising: establish a multi-access point connection between a user device and multiple access points of which one is a serving access point; and; in response to interruption of the connection between the user device and the serving access point, the user device handing over to a different one of the multiple access points using the established multi-access point connection such that the different one of the multiple access points becomes a new serving access point.

In a fourth embodiment of these teachings there is a method comprising: receiving at an access point from a user device on a random access channel a connection establishment request with a list of candidate access points; and in reply to receiving the connection establishment request, instantiating a cluster set manager for the user device and forwarding the connection establishment request to the cluster set manager so as to establish a multi-access point connection with the user device.

In a fifth embodiment of these teachings there is a computer readable memory tangibly storing a computer program that when executed causes a host access point to: receive at an access point from a user device on a random access channel a connection establishment request with a list of candidate access points; and in reply to receiving the connection establishment request, instantiating a cluster set manager for the user device and forwarding the connection establishment request to the cluster set manager so as to establish a multi-access point connection with the user device.

In a sixth embodiment of these teachings there is an apparatus comprising at least one processor and at least one memory storing a computer program. In this embodiment the at least one processor is configured with the at least one memory and the computer program to cause the apparatus to perform actions comprising receive at an access point from a user device on a random access channel a connection establishment request with a list of candidate access points; and in reply to receiving the connection establishment request, instantiating a cluster set manager for the user device and forwarding the connection establishment request to the cluster set manager so as to establish a multi-access point connection with the user device.

In a seventh embodiment of these teachings there is a method comprising: receiving at a cluster set manager a connection establishment request from a user device via a temporary serving access point; and thereafter establishing a multi-access point connection between the user device and multiple access points of which one is a serving access point selected by the cluster set manager.

In an eighth embodiment of these teachings there is a computer readable memory tangibly storing a computer program that when executed causes a host cluster set manager to receive at a cluster set manager a connection establishment request from a user device via a temporary serving access point; and thereafter establishing a multi-access point connection between the user device and multiple access points of which one is a serving access point selected by the cluster set manager.

In a ninth embodiment of these teachings there is an apparatus comprising at least one processor and at least one memory storing a computer program. In this embodiment the at least one processor is configured with the at least one memory and the computer program to cause the apparatus to perform actions comprising: receive at a cluster set manager a connection establishment request from a user device via a temporary serving access point; and thereafter establishing a multi-access point connection between the user device and multiple access points of which one is a serving access point selected by the cluster set manager.

These aspects and others are detailed further below with particularity.

DETAILED DESCRIPTION

The reference 3GPP TR 36.819 mentioned above is relevant to these teachings in that it uses a multi-connectivity approach for improving performances. More specifically, for the LTE radio access technology on more conventional cellular bands there is a Dynamic Cell Selection (DCS) strategy for the LTE coordinated multi-point (CoMP) transmission scheme in which a user terminal receives downlink transmissions from one of the multiple transmission points. The DCS strategy is to change the serving transmission point dynamically based on instantaneous channel feedback from the terminal. Notably, in this scheme the user terminal monitors the downlink control channel of only one transmission point and thus it cannot be used to solve the present problem because the blockage of the control channel link due to shadowing in a 5G network will render the connection unrecoverable.

There is also a dual connectivity approach for LTE release 12 set forth at reference 3GPP TR 36.842 mentioned above. In this scheme the UE connects to two different eNodeBs using two different carriers and so this option is not transferrable to the 5G cluster set radio environment. To adapt the LTE connection establishment approach to the 5G radio access technology would necessitate multiple rounds of communication between the UD and a given AP in order for the UD to send the required connection parameters to the radio access network because the capacity of the random access channel is limited. This would of course result in delays in connection establishment that are anticipated to be well reasonable and so this is not an optimal solution for 5G systems.

The two US patent applications mentioned above are co-owned and deal with cluster set management/configuration and physical layer radio channel allocation/configuration for maintaining connectivity with multiple APs. Certain of these teachings detailed with particularity below address the problem of RRC connection establishment using certain frameworks of these prior two co-owned patent applications, and so those two prior co-owned US patent applications are hereby incorporated by reference.

Figure 2:
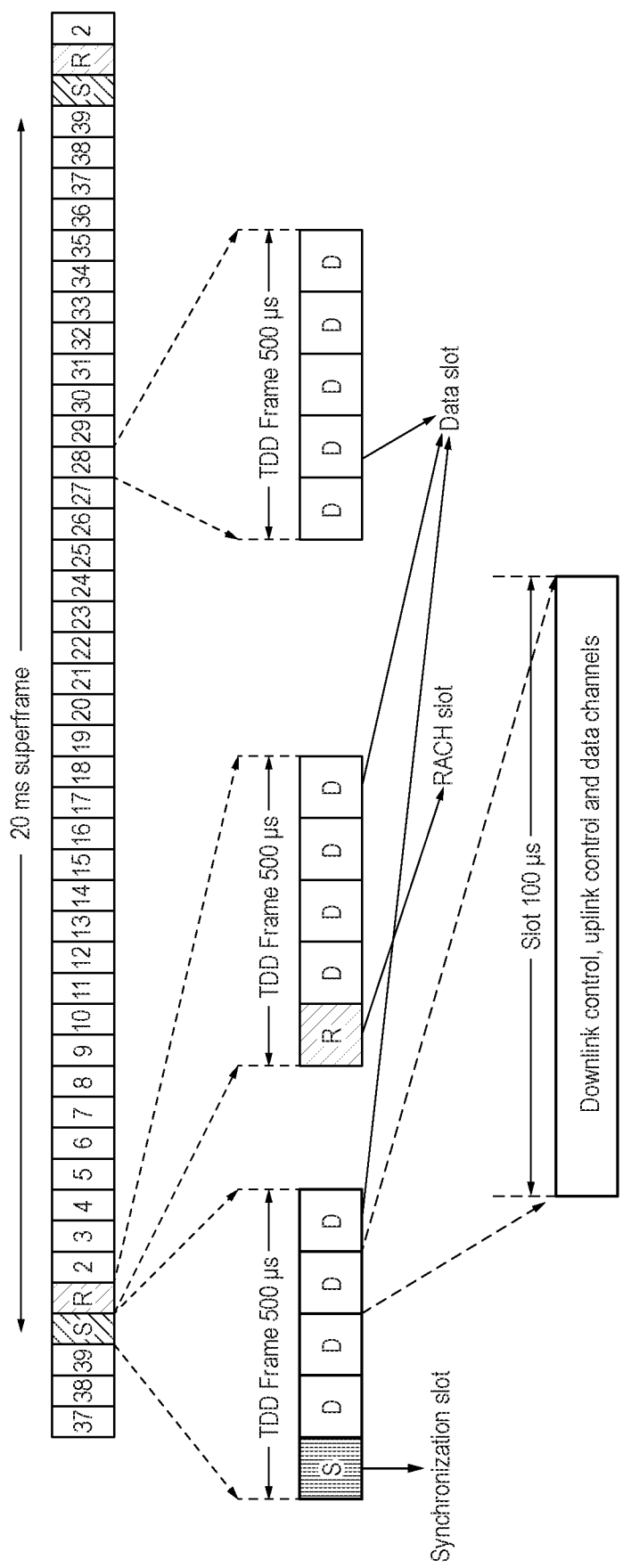
FIG. 2 is a prior art schematic diagram illustrating the radio frame structure for mmWave 5G radio access technology.

FIG. 2 illustrates the air-interface frame structure proposed for a mmWave 5G system, and is exemplary for a specific deployment of these teachings but not limiting thereto. In this frame structure a 20 msec superframe is subdivided into 40 subframes each of duration 500 microsec (μsec). Each subframe is further divided into 5 slots of 100 μsec duration. A slot can be used for synchronization channel (generally SYNC, but shown as S in FIG. 2 for conciseness given the scale of the figure), uplink random access channel (generally RACH but shown as R in FIG. 2) or a data channel (shown as D in FIG. 2).

The SYNC is used to transmit the synchronization signal and the Master Information Block (MIB), which contains information required for system acquisition. The SYNC channel transmission is also used by the UD for beam synchronization. The SYNC channel is transmitted every 20 msec in 5G mmWave. For maximizing the coverage, the SYNC is transmitted in the form of a grid of multiple beams, each beam pointing to a particular location of the cell and the MIB is carried in each beam. The size of the MIB is small by cellular standards, typically 100 or 200 bits depending on the system bandwidth. Thus, only the most critical information for system acquisition are included in MIB. The RACH slot can be used by a UD for uplink synchronization, to provide feedback on beam selection, and also to send an uplink resource request.

The data slot contains downlink control channels, uplink control channels and data channels for downlink and uplink data transmissions. In order to meet the link budget and maximize efficiency, UD-specific beamforming techniques are used for all communications between an AP and a UD in a data slot. In addition, use of analog beamforming at the transmitter and receiver requires that all communication channels for different UD and AP pairs are time division multiplexed (TDM).

The problem of connection establishment in a mmWave 5G network is of concern due to the severe shadowing issues. The connection consists of a radio resource control (RRC) connection between the UD and the radio access network (RAN), and further interface connections (S1 interface in the case of a 5G RAN) between the RAN and the core network (CN) elements such as the user-plane gateway (uGW) and the mobility management entity (MME). In embodiments of these teachings the S1 connection is specifically between the CSM 30 and the core network. In general this connection setup requires that the UD sends Non-Access Stratum (NAS) information, identifying the public land mobile network (PLMN), MME and such to the RAN, based on which the RAN determines which of several core networks to connect to. The connection configuration needs to inherently support rapid rerouting and low-latency operations, preferably by utilizing the AP diversity. In addition, it is desirable that the connection establishment procedure is fast and robust so that the low latency requirements of 5G can be met.

More specifically, in a 5G mmW system, the connection between the UD and the network as well as the connection establishment procedure preferably meets the following criteria. First, in order to support rapid rerouting the UD's connection to the network needs to be established with multiple APs as attachment points, so that in the event of radio link blockage to its current serving AP the UD can use its attachment to an alternate AP in the cluster set while still incurring only a minimal latency for the handover. Second, the low latency requirements of 5G dictate that connection establishment latency also be reduced, as compared to existing systems which are handicapped by their very limited capacities of uplink control channels such as the random access channel. Third, the limited capacities of the downlink broadcast channel in a mmW air interface may prevent the transmission of network and system configuration parameters, such as access point loads, which may dictate the serving cell selection. SYNCH and part of the system information essential for initial system acquisition in mmWave 5G may be broadcast and the rest of the system information may be acquired by a user device by unicast a mechanism. For this reason new methods are required to mitigate this shortcoming in a fast and efficient way. And fourth, the connection establishment process should be able to recover from radio link blockage events without incurring any significant delay.

Below are detailed connection establishment procedures that can satisfy all of the above criteria and which are described by way of example in the context of a mmWave access network radio environment. Specifically, the RRC connection is established between the UD and the CSM of the UD, instead of between the UD and an AP. The core network connections are established between the CSM and the core network elements, uGW and MME. The RRC connection is a multi-AP connection, where the UD may monitor multiple APs in its cluster set for control and user plane messages. This multi-AP monitoring enables fast handoff during rapid rerouting in the event of radio link blockage between the serving AP and the UD. The access stratum (AS) security configurations are setup at the CSM, instead of at the serving AP.

Figure 1:
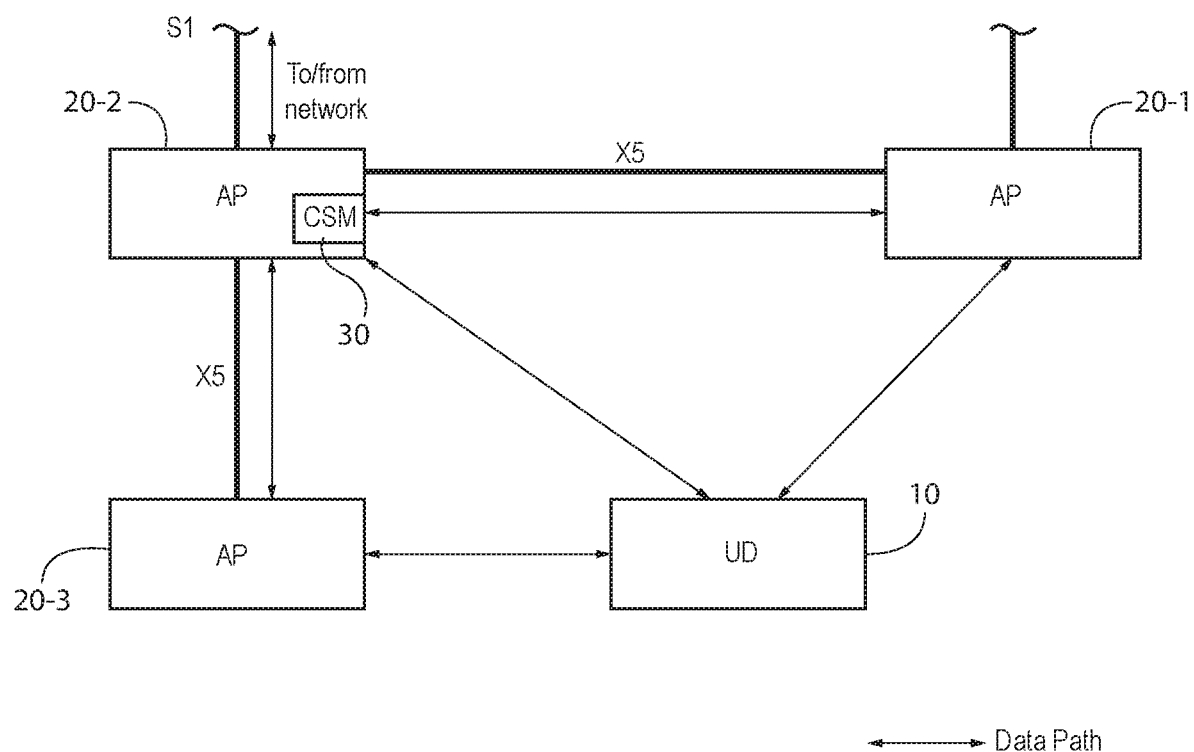
FIG. 1 is a conceptual diagram illustrating a user equipment/user device UD with three serving cells APs in its cluster set and one cluster set manager CSM according to conventional understanding of how certain aspects of 5G radio access technology will be deployed.

First the broader aspects of these teachings are described with reference to the example radio environment delineated by FIGS. 1-2. The UD 10 is in the coverage area of multiple APs, and assume the three illustrated APs 20-1, 20-2 and 20-3 are suitable for being in the same cluster for this UD 10. There may be many other APs in the vicinity but further APs are not specifically shown. Further APs may simply be repetitive of those shown or they may not be suitable for this UD's cluster for any of several reasons (for example, they may be in different baseband pools, or for the case of independent APs their signal strength/quality may not meet a prescribed threshold). The CSM 30 is co-located with one of these APs 20-2 but need not be so in all cases.

In general the connection establishment procedure according to embodiments of these teachings works as follows.

First the UD selects an AP from the set of accessible APs as its temporary serving AP. If the set is APs 20-1, 20-2 and 20-3 of FIG. 1, assume the UD 10 selects AP 20-2 at this juncture as its temporary serving AP. In the initial random access message over the RACH (see FIG. 2, one pre-defined 100 μsec slot of a 20 msec superframe), the UD 10 includes a) a connection request for a RRC connection; b) a connection request for a S1 connection; c) an AP-report containing, for each of the accessible APs, c1) best beam and signal strength or quality of the best beam, c2) Channel Quality Indicator (CQI), and c3) DL control monitoring configuration. All of this above information can be sent because in mmWave 5G the RACH bandwidth is very large (~1 GHz) as compared to the LTE RACH.

In some radio access technology deployments it may not be possible for the UD 10 to send all of this information for all the accessible APs on the RACH itself. In this case the UD 10 can send the accessible AP information on radio resources that are granted to it in response to its resource request on the RACH. This would typically impose only a slight delay as compared to the above mmWave 5G scenario where the RACH slot is sufficiently large to carry all that AP information.

Further, the network may require a minimum number of APs in a cluster set before setting up a multi-AP RRC connection; too few APs in a UD's cluster would mean a higher likelihood of breaking the mmWave connection when the inevitable shadowing occurs. If this is a prescribed minimum the UD 10 could know it in advance and abstain from requesting such a connection until it compiles the information for its AP report from that minimum number of APs. But in practice this minimum is more likely to be specific to a given geographic area so that crowded areas more susceptible to shadowing effects might require a higher minimum number of APs to setup a multi-AP RRC connection than more open and less susceptible areas. In this case the UD 10 may send its AP-report with a list of accessible APs that numbers fewer than the local network's minimum. It is likely the UD 10 can readily acquire information about further APs in this case, and so in addition to the 'partial AP-list' the UD sent with its initial RACH message the UD 10 can subsequently send a supplemental AP report with information on one or more additional APs. The temporary AP and the CSM can begin setting up the multi-AP connection upon receipt of the initial RACH message with the partial AP-list as described herein, but suspend the actual RRC connection setup until receiving the UD's supplemental AP-list that with the partial AP-list will satisfy the network's minimum number of APs for a UD cluster set.

The UD 10 begins monitoring the downlink control channels of its accessible APs 20-1, 20-2 and 20-3. It monitors the temporary serving AP 20-2 for messages addressed to the mobile radio network temporary identifier (mRNTI) that was allocated to the UD 10 as part of the random access procedure. For other APs 20-1 and 20-3, the UD 10 monitors for messages addressed to the beam-index of the best beam for that respective AP 20-1, 20-3.

Upon receiving the RACH message, the temporary serving AP 20-2 forwards the connection request and the AP-reports to the CSM 30 of the UD 10. Upon receiving this connection request and AP-reports, the CSM 30 initiates two parallel actions. One such action is the CSM 30 establishes S1 connections with a uGW and a MME. In one embodiment of this the CSM 30 sends the S1 connection request and a security configuration request to the MME, but in another embodiment the MME by default can convey the security configurations (without having received any security configuration request) as part of its S1 establishment procedure once it gets the configuration request from the CSM 30. The other parallel action is the CSM 30 configures the cluster set. In this case the CSM selects the APs in the cluster set and sends a configuration request to each of those APs for multi-connectivity configuration. While the AP can refrain from including any one or more of the APs identified in the UD's AP report in the cluster set, for this example assume the CSM 30 chooses the three APs shown at FIG. 1 as the members of this UD's cluster set.

From this cluster set the CSM 30 selects a serving AP, which may be same as the temporary serving AP or another AP in the cluster set (CS). Selection of the serving AP by the CSM 30 may be based on various considerations such as signal strength or CQI of the best beam for the UD and load balancing. In this example assume the CSM 30 selects AP 20-1 as the serving AP. On receiving the S1 connection configuration and security configuration from the MME, the CSM 30 sends a security mode command and the RRC configuration to the serving AP which is now AP 20-1. The serving AP 20-1 forwards them to the UD 10 and uses the beam-index reported by the UD 10 for AP 20-1, for addressing the UD 10.

Upon receiving the security mode command and RRC configuration, the UD 10 sets up the security configuration and sends a security mode complete message to the CSM 30 via the serving AP 20-1. At this point the UD 10 may begin non-latency critical user plane communication with the network.

When the CSM 10 receives the cluster configuration from all the APs 20-1, 20-2, 20-3 in the cluster set, it sends the information to the serving AP 20-1. The serving AP 20-1 then forwards this information to the UD 10. In a particular embodiment using this same serving AP example, while sending the security mode command to the UD the serving AP 20-1 may include its configurations in which case it would not need to send this information to the CSM 30. This assumes that the serving AP 20-1 has already received the cluster configuration request. This particular embodiment depends on the relative timings of the messages 5 through 8 in FIG. 3-6 as detailed below. Messages 5, 7, and 8 are sequential in FIGS. 3-6 below; but in this embodiment messages 5, 7 and 8 can be concurrent with message 6. In another specific embodiment the cluster configuration request for AP 20-1 is included in the message 8, in which case it is not necessary that the CSM 30 receive the configuration from the serving AP 20-1. However, the CSM 30 may need the load information from the temporary serving AP 20-1 for purposes of making its selection of which AP in the cluster set will be the serving AP. In all these cases, the serving AP 20-1 may send the cluster configuration to the UD 10 but it does not send any cluster configuration to the CSM 30.

Upon receiving the cluster set configuration, the UD 10 begins monitoring the cluster APs 20-1, 20-2, 20-3 and performs UL access as per the received configuration. Then the UD 10 sends a connection establishment complete message to the CSM 30. Upon receiving the connection establishment complete message, the CSM 30 forwards it to the APs 20-1, 20-2, 20-3 in cluster set.

There are certain notable features in the above overview of these teachings. As to the connection itself, the Access Stratum (AS) connection of the UD 10 is set up with the CSM 30, which may be located in a RAN entity different from the serving AP. This eliminates the necessity of reinitializing/reconfiguring the AS connection with every (intra-cluster set) handoff associated with frequent radio link blockages. Thus embodiments of these teachings reduce handoff latency during rapid rerouting. Further, the RRC connection uses multiple APs 20-1, 20-2, 20-3 to maintain connectivity with the UD 10. This makes the connection robust against radio link blockages, further enabling fast handoff. Note also that because the security is established through the CSM 30 and not through any individual AP, the AS security configuration does not change even if the UD's serving AP changes during rapid rerouting within the cluster set.

There are further notable features concerning the connection establishment procedure. Namely, the connection establishment request and NAS information are sent by the UD 10 during the initial access step (with the temporary serving AP 20-2 in the above example), thereby reducing connection setup latency. Upon receiving the connection establishment request and NAS information, the temporary serving AP forwards them to the CSM 30 rather than initiating the connection setup procedure with the UD 10 on its own; in these teachings the CSM 30 initiates the connection setup procedure rather than the (temporary) serving AP. Further, the network can select a serving AP for the UD 10, which may be different from the (temporary serving) AP to which the connection request was sent during the connection establishment. This allows the network to select the best AP as the serving AP from various considerations, such as performance, accessibility authorization etc. The above techniques for communicating with the UD 10, for example using beam-index for addressing the UD 10, helps to select the optimum cell during connection establishment and thereby saves additional latency of cell re-selection. And finally if there is detected some radio link blockage during delivery of connection establishment messages to the UD 10, the connection messages are easily rerouted to another AP in the cluster set. This adds robustness against radio link blockage to the connection establishment procedure itself.

Figure 3:
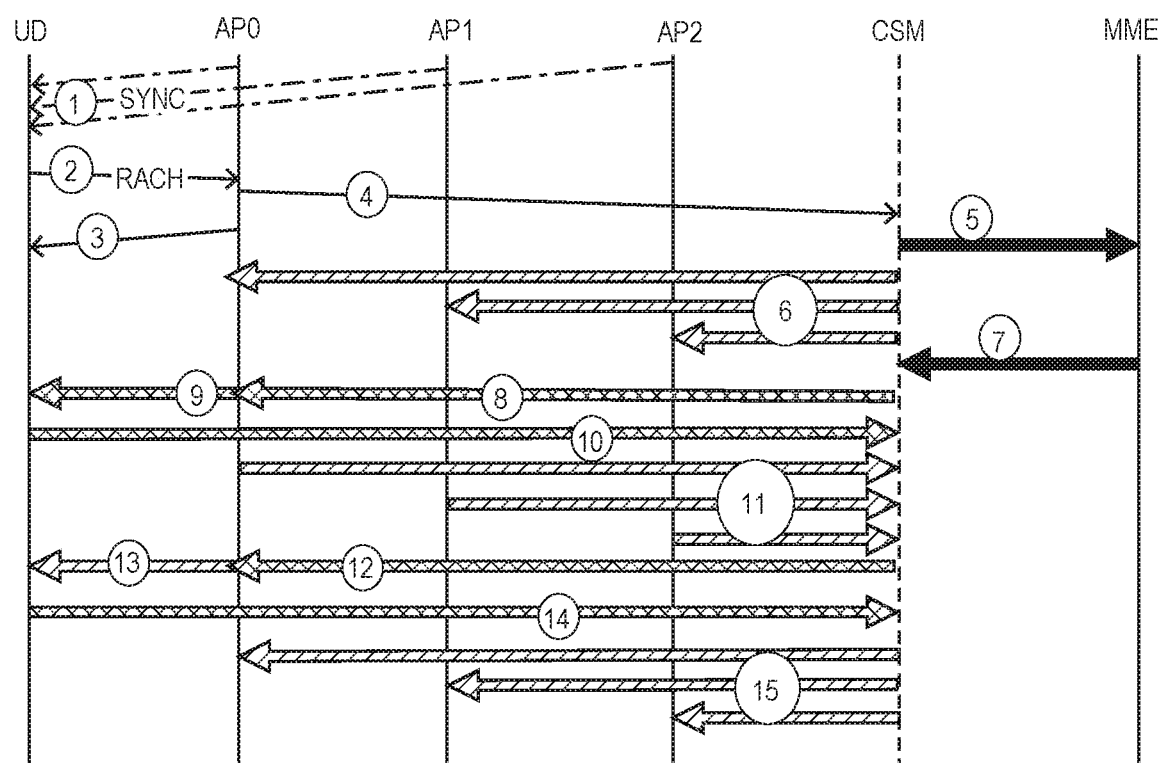
FIG. 3 is a signaling diagram illustrating an embodiment of a connection establishment procedure that may be deployed in a mmWave 5G access network.

Now are described a few more particularized examples with respect to FIGS. 3-6. FIG. 3 is a signaling diagram illustrating an example connection establishment procedure that may be deployed in a mmW 5G access network and begins when a UD 10 in idle state receives a page from the network, or when the user initiates a service or application on the UD 10. This example messaging sequence for the connection establishment have AP0, AP1 and AP2 in place of reference numbers used for the APs in FIG. 1.

Message 1 in FIG. 3 is the broadcast SYNCH signal and MIB broadcast from each of the APs and received by the UD 10. Based on the UD's measurements of the SYNC signal and the information in the Master Information Block (MIB) of the various APs, the UD selects a set of candidate APs (AP-list) for its cluster set and acquires the accessibility information for each of them. This set of candidate APs may be considered as the UD's AP-list, and the accessibility information includes the DL control channel configuration, the uplink RACH configuration, the best beam for the UD to communicate with the respective AP, and the channel quality/strength for the best beam for the respective AP.

Message 2 in FIG. 3 is from the UD 10 to the temporary serving AP that the UD 10 selects from its AP-list, and is a RACH and Connection Establishment Request sent on the RACH (see the RACH slot at FIG. 2). The UD selects a temporary serving AP based on Message 1, and in the FIG. 3 example AP0 is the temporary serving AP it selected. The UD 10 performs a random access procedure over the RACH of the temporary serving AP and includes the Connection Establishment Request. This connection establishment request includes a) a connection request, b) the AP-list, and c) an AP report for each AP in that list. More specifically, the connection request includes a1) the UD identification (such as for example S-TMSI or IMSI, and/or a random number), a2) the RRC connection request, and a3) the S1 connection request. The AP-list is the list of candidate APs for the UD's eventual AP cluster set (which is decided by the CSM). The AP-report for each of these candidate APs in this AP-list includes c1) the best beams for downlink and uplink communications (for example, each reported as a beam-index), c2) DL control channel timing and configuration which the UD may monitor, and c3) a CQI or signal strength measurement report for the best beams.

Assuming the temporary serving AP0 can successfully detect the RACH preamble and decode the content of the RACH message 2, this causes the temporary serving AP0 to generate two messages, shown in FIG. 3 as Message 3 and Message 4. Message 3 is the random access response (RAR) which the temporary serving AP0 sends to the UD 10. The RAR includes the mRNTI which is the identity for addressing the UD 10 by the AP0, and also the random number or other such UD identification that the UD 10 itself included in Message 2.

Message 4 in FIG. 3 is from the temporary serving AP0 to the CSM 30 and is a connection establishment request. The temporary serving AP, AP0, instantiates a CSM 30 for the UD 10 with assistance of the network management module and then sends message 4 to the CSM. In some deployments the temporary serving AP0 may also append its DL and UL control channel allocation for the UD 10 in this Message 4 and this alternative is more fully described below with respect to FIG. 6.

Upon receiving the connection establishment request/Message 4, the CSM 30 generates two sets of messages: Message 5 and Message 6. Message 5 is a Core Network Connection and Security Configuration request, which the CSM 30 sends to the MME 40 for establishment of S1 connections (or more generally, the connections from the RAN represented in FIG. 1 as the APs plus the CSM to the core network). This Message 5 further requests security configurations.

The CSM 30 selects the APs which are to be the members of this UD's cluster set from the AP-list the CSM 30 received in Message 4, and sends Message 6 which is an AP Configuration Request to each of those cluster set APs. In the specific example at FIG. 3 the CSM 30 selects AP0, AP1 and AP2 for the UD's cluster set which are exactly the APs in the UD's AP-list, but in other examples the CSM 30 need not select each and every AP that is on the UD's AP-list. This configuration request includes a) a RRC configuration request, which for example may include the RLC parameters setup, radio bearer configuration setup, mRNTI allocation, and other such parameters in a conventional LTE configuration request message, and further b) a control channel allocation request which for example may include requests for DL control channel, the UL polling channel, and other channels in the conventional LTE control channel allocation request (and in some embodiments may further include the constraints for those allocations).

The next message at FIG. 3 is Message 7 from the MME 40 to the CSM 30 (generated in response to receiving Message 5) and this is a Core Network Connection and Security Configuration message that informs the CSM 30 of the core network connection configuration and also the security configuration. In one example the security configuration may include the base keys to be used by the CSM for generating the ciphering and authentication keys for the AS communications.

Figure 4:
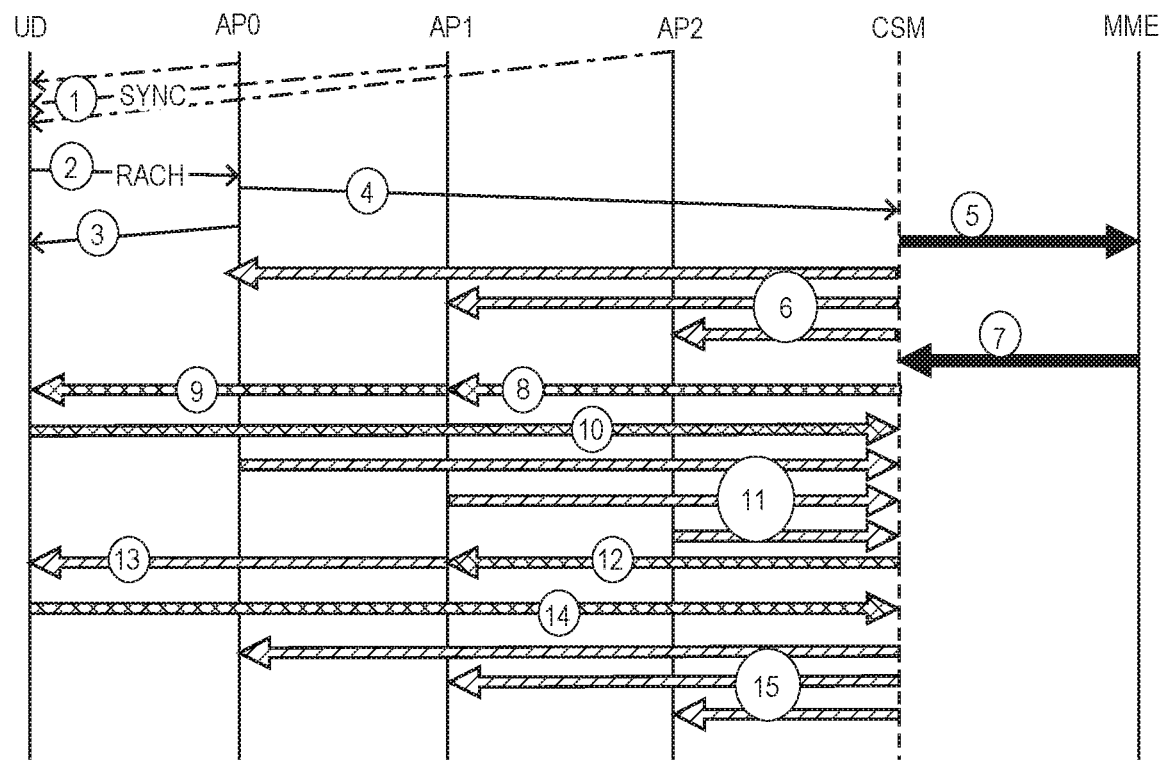
FIG. 4 is similar to FIG. 3 but specifically illustrating an example in which the CSM selects a serving AP (AP1) different from a temporary serving AP (AP0).

The CSM 30 selects a serving AP for the UD from the cluster set. In the FIG. 3 example the CSM 30 selects AP0 which is the same AP selected by the UD 10 as its temporary serving AP but this need not always be the case; from load balancing or other metrics that the CSM 30 may take into consideration this selected serving AP may be different from the temporary serving AP. In any case, the CSM 30 sends Message 8 which is a Security Mode Command and RRC configuration message to the serving AP0 it selected. FIG. 4 has an example in which the serving AP selected by the CSM 30 is not the same as the temporary serving AP selected by the UD 10.

The serving AP0 forwards the security mode command and RRC configuration to the UD 10, and this forwarding is shown as Message 9 in FIG. 3. But Message 8 and Message 9 are not identical in all instances, so to distinguish them Message 8 may be considered Security Mode Command and RRC configuration 1 while Message 9 might be considered as Security Mode Command and RRC configuration 2. If the serving AP is the same as the temporary serving AP as in the FIG. 3 example the UD 10 can be addressed by the mRNTI, already allocated and communicated to the UD in Message 3. Otherwise such as in the FIG. 4 example that is detailed further below, the UD 10 may be addressed in Message 9 by the beam-index of the UD-selected best beam for this serving AP and the UD identity (e.g., S-TMSI or IMSI or random number from message 2) is also included in the Message 9. The serving AP also includes the mRNTI allocated for the UD 10 in the Message 9, (if not already allocated as would be the case in some examples where the UD-selected temporary serving AP is not the same as the CSM-selected serving AP). This mRNTI is to be used for addressing the UD in subsequent communications between the UD 10 and the serving AP.

The UD 10 may receive the Message 9 addressed to its allocated mRNTI from its the temporary serving AP. Alternatively the UD may receive Message 9 from an AP it is monitoring by the best beam index for the AP and matching its ID (S-TMSI, or IMSI or the random number it sent over message 2) with the UD identity in Message 9; Upon receiving the Security Mode Command message 9, the UD 10 validates its authenticity. The UD 10 retrieves the mRNTI from that received message 9 (if it was received from an AP other than the UD-selected temporary serving AP, otherwise in some embodiments message 9 will have been addressed to the UD using the previously-assigned mRNTI), and then sends a Security Mode Complete message 10 to the CSM 30 via the serving AP0.

Upon receiving the AP/Cluster Configuration Request (Message 6) from the CSM 30, each AP configures radio resources for the UD 10, which includes the RLC configuration, radio bearer configuration and DL and UL control channel allocation for multi-connectivity. These APs also allocate an mRNTI for the UD. Then these cluster set APs send the radio resource configuration and mRNTI to the UD's CSM 30 in Message 11 which is an AP Configuration Response message. Each of these AP configuration response messages may also include load information of the respective AP.

Message 12 in FIG. 3 is a Cluster Configuration 1 message. When the CSM 30 receives the AP configuration messages 11 from the APs in the cluster set, it may re-select if necessary the serving AP based on the received AP status information (such as load and/or admission control as detailed further below with respect to FIG. 5). The CSM 30 then sends a cluster configuration message 12 containing this information to the serving AP. In one example this message 12 includes a) the DL control channel(s) to be monitored by the UD 10, b) the UL polling channel the AP is to monitor for messages from the UD 10, and c) the mRNTIs used by the APs for the identification of the UD 10. Message 12 may further include the RRC configuration of each of the APs in the UD's cluster set.

Message 13 in FIG. 3 is a Cluster Configuration 2 message that is the version of Message 12 forwarded by the serving AP0 to the UD 10, in a manner similar to that described above for the forwarding of message 8 from the CSM 30 as message 9 to the UD 10.

Message 14 in FIG. 3 is a Cluster Configuration Confirm 1 message from the UD 10 to the CSM 30 (via the serving AP0). Upon receiving the cluster configuration message 13, the UD 10 configures itself to use the DL and UL control channels as described in the message and this message 13 is confirmation to the CSM 30 of that configuring.

Upon receiving the cluster configuration confirm 1 message, the CSM 30 forwards it to each AP in the cluster set of the UD 10, shown in FIG. 3 as message 14 which may be considered as a Cluster Configuration Confirm 2 message. After receiving this message, the cluster connectivity of the UD 10 is completely setup and the low-latency data session may begin.

The messages at FIG. 4 are similar to those detailed above for FIG. 3. The difference is that in FIG. 3 the CSM 30 selected AP0 as the serving AP which was the same AP0 that the UD 10 selected as the temporary serving AP, whereas in FIG. 4 the CSM 30 selects AP1 as the serving AP which differs from AP0 that the UD 10 selected as the temporary serving AP. FIG. 4 illustrates the difference in signalling the similar messages in that scenario. Namely, the Security Mode Command and RRC Configuration 1 message which is Message 8 is sent from the CSM 30 to AP1 (as opposed to AP0 in FIG. 3) and it is AP1 that forwards this as Message 9 to the UD 10. Similarly, in FIG. 4 the AP Configuration 1 Message 12 from the CSM 30 goes to AP1 which forwards it to the UD 10 as Message 13; and the UD's reply confirmation Message 14 goes to the CSM 30 via the serving AP1.

Figure 5:
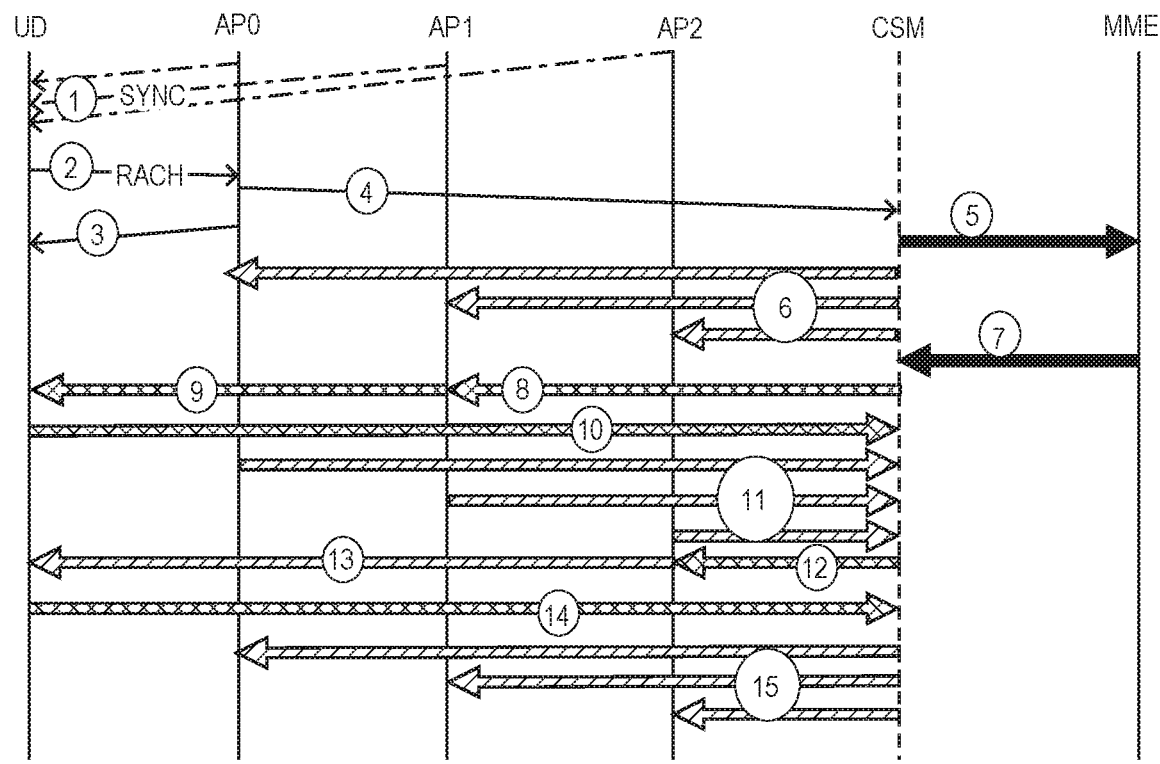
FIG. 5 is similar to FIG. 4 but specifically illustrating an example in which the CSM re-selects a serving AP (AP2) based on AP status information different from the previously selected serving AP (AP1).

The signalling diagram of FIG. 5 has a further change to the serving AP as compared to FIG. 4. Like FIG. 4, the UD 10 selects AP0 as the temporary serving AP and the CSM 30 establishes AP1 as the serving AP by sending to it Message 8 (Security Mode Command and RRC Configuration 1). Whereas AP1 remains the serving AP throughout the remainder of FIG. 4, in FIG. 5 there is a further change of the serving AP from AP1 to AP2 which can occur due to the further information on the individual APs (such as load conditions) that the CSM 30 receives in Message 11 (AP Configuration Response) from each of the APs in the cluster set. In the FIG. 5 example the CSM 30 has made the choice to change the serving AP, and so it sends Message 12 (Cluster Configuration 1) to the new serving AP2. Message 13 is then sent to the UD 10 from this new serving AP2 and Message 14 goes from the UD 10 to the CSM 30 via this new serving AP2.

Figure 6:
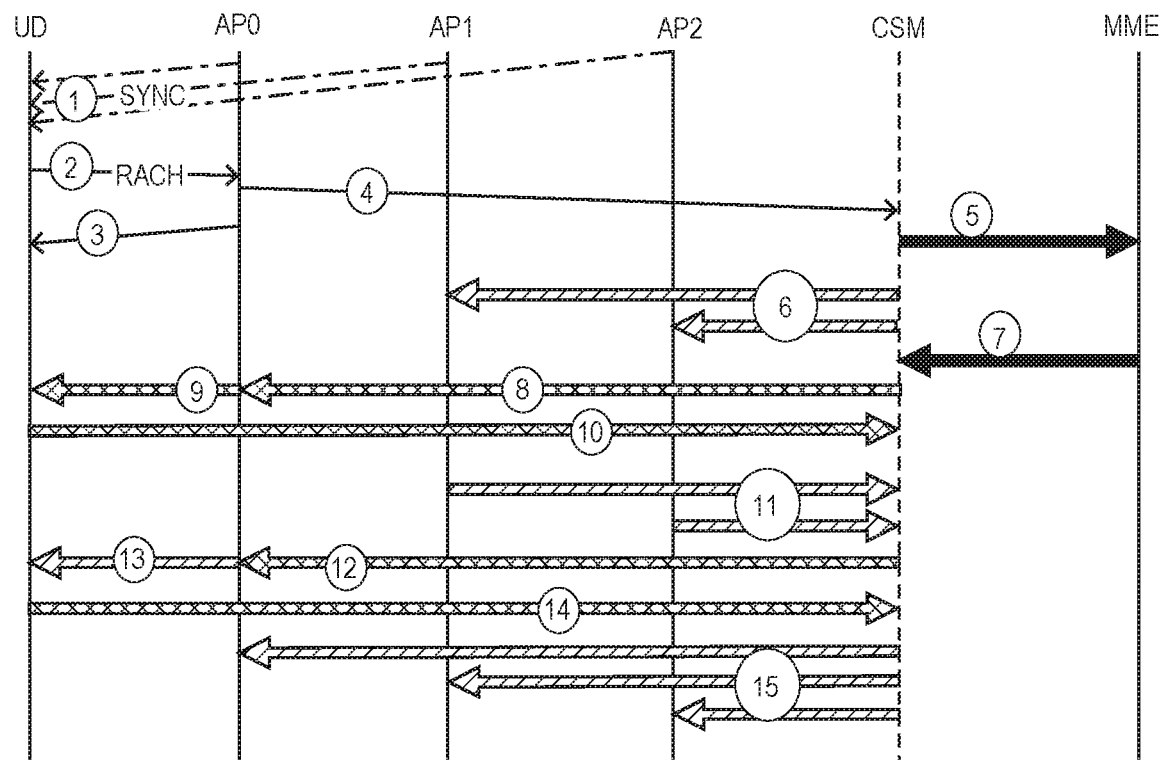
FIG. 6 is similar to FIG. 3 but specifically illustrating an example in which the temporary serving AP (AP0) includes its configuration including control channel allocation to the CSM in the Connection Establishment message (Message 4).

The signaling diagram of FIG. 6 illustrates an example in which the temporary serving AP0 includes its configuration, such as DL and UL control channel allocations for the UD 10, in the Connection Establishment Request (Message 4) that it sends to the CSM 30. Subsequently, the CSM 30 does not have to send the AP configuration request (Message 6) to this temporary serving AP0 and hence does not receive any further AP configuration (Message 11) from it.

Certain of the above embodiments of these teachings offer various technical advantages as compared to the prior art where a 5G connection lost due to fading would need to be re-established with a different AP. Specifically, in these examples the established connection is far more robust against frequent radio link blockages as can be expected to occur in mmWave radio access technologies. In the event of a radio link blockage to the serving AP, the connection is rerouted via another AP without incurring the long delay and overheads of connection re-establishments. Another salient technical effect is a reduction in connection establishment latency. This is realized in part by utilizing the higher capacity of the uplink random access channel in 5G proposals (see FIG. 2) as compared to more conventional cellular RATs to send the connection establishment commands and parameters with the initial random access step (Message 2 in FIGS. 3-6). Further latency reduction may be achieved by parallelizing the core network connection establishment and the RRC connection establishment procedures, which is detailed above with respect to the S1 and RRC connections.

The limited capacities of the broadcast channels in a mmWave access network allow only the most important information for system acquisition to be broadcasted. This may prevent broadcasting various parameters, such as parameters used for load balancing among the different APs. The connection establishment procedures that are detailed above present some non-limiting examples of where such load balancing information may be communicated between the RAN entities, and in this regard these teachings provide the further technical effect of overcoming those broadcast capacity shortcomings and can thus achieve optimized cell selection taking into account the network and system considerations such as load balancing. A still further technical effect is that the UD 10 may begin non-latency critical user plane communication with the RAN as soon as it receives the RRC and security configurations from the serving AP (that is selected by the CSM 30), and subsequently the UD 10 can start a low latency session once it receives the RRC configurations of the remaining APs in the cluster set. This two-step procedure provides the technical effect of enabling fast access and data transfer.

Figure 7A:
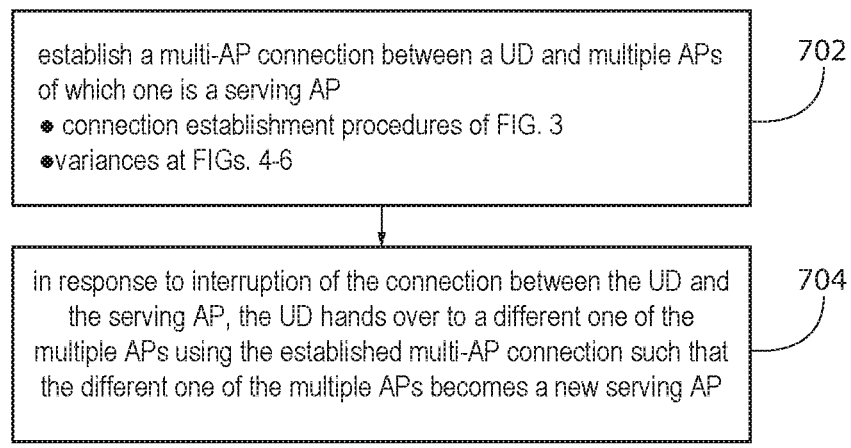
FIGS. 7A-C are process flow diagrams summarizing certain aspects of the invention from the perspective of an individual UD and of an individual AP and of the CSM, respectively.

FIG. 7A is a flow diagram from the perspective of the UD that summarizes some of the above features. It begins at block 702 where the UD establishes a multi-access point connection between itself and multiple APs of which one is a serving AP. The specific processes to do so are shown by example at FIG. 3, with various alternatives at FIGS. 4-6. Then at block 704, in response to interruption of that portion of the multi-AP connection that goes between the UD and the serving AP, the UD hands over to a different one of the multiple APs using the established multi-AP connection such that the different one of the multiple APs becomes a new serving AP.

There are many details above for accomplishing block 702. For example, after the UD receives the synchronization signal and system information (MIB) from one or more access points (AP), it determines a set of accessible APs which is its AP-list. It selects a temporary serving AP from the AP-list and also a temporary downlink control channel monitoring configuration for each AP in the AP-list. The UD performs a random access procedure over the RACH of the temporary serving AP. Along with the random access preamble, the UD also sends the following information over the RACH:
 a. AP-list. A list of candidate APs for cluster set.
 b. For each AP in AP-list, an AP-report containing:
  i. accessibility information, which includes the best beam information;
  ii. the temporary downlink control channel monitoring configuration;
  iii. channel quality/strength measurement report for best beam.
 c. A Connection request which includes the following:
  i. RRC connection establishment request;
  ii. S1 connection setup request;
  iii. UD identification which may include IMSI, S-TMSI, and/or a random number;
  iv. PLMN identification and MME.

The UD then begins monitoring the DL control channel of the APs in its AP-list according to its temporary downlink control channel monitoring configuration. The UD monitors the DL control channel of an AP for allocation addressed by the beam-index, which is functionally determined by the best beam selected for that AP.

Upon receiving a Random Access Response (RAR) message, the UD first determines that the RAR is intended for itself by matching the random number or UD identification in the RAR message. If it matches, the UD retrieves the mRNTI allocated by the temporary serving AP. The UD continues monitoring the DL control channels of the APs in the AP-list as follows:
 a. For the temporary serving AP, the UD monitors the DL control channel using the allocated mRNTI;
 b. For all other APs in the AP-list, The UD monitors the DL control channel of an AP for messages addressed to the beam-index of the best beam selected by the UD.

Upon receiving the RRC connection and Security Mode configuration message, the UD configures the RRC connection, such as RLC parameters, and the security setup such as the authentication and encryption parameters. Subsequently the UD sends a RRC connection and Security mode complete message to the sending AP.

Upon receiving the cluster configuration message, the UD configures its cluster set and control channel monitoring and usage as indicated in the message. For each AP in the cluster set, it begins monitoring the DL control channel for messages addressed to the mRNTI allocated by the AP. Subsequently, the UD sends a cluster configuration confirm message to the serving AP.

Figure 7B:
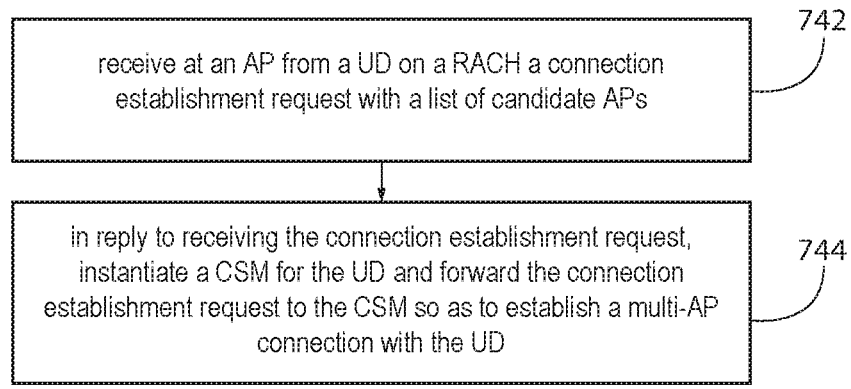

FIG. 7B is a flow diagram from the perspective of one of the APs that summarizes some of the above features, more specifically from the AP that is first in contact with the UD and which above is characterized as the temporary serving AP. It begins at block 742 where the AP receives from a UD on a RACH a connection establishment request with a list of candidate APs. Then at block 744, in reply to receiving the connection establishment request, it instantiates a CSM for the UD and forwards the connection establishment request to the CSM so as to establish a multi-AP connection with the UD.

Some of the details from above with respect to the AP of FIG. 7B are summarized here. On receiving that AP-list, which also comes in the same message with an accessibility report and the connection request from the UD over the RACH, the AP forwards this information to the CSM that is instantiated for the UD. Upon later receiving a request for RRC connection configuration for the UD, and possibly for other network or system information such AP load, this AP sets up the RRC configuration for communication with the UD, such as allocating a mRNTI for addressing the UD and configuring the protocol stack such as RLC for the radio bearers. The AP sends the AP configuration and status to the CSM of the UD.

Then upon receiving the RRC configuration and Security mode configuration (and/or the cluster configuration message, depending on whether the CSM has changed the serving AP) from the CSM of this UD, the AP transparently forwards them to the UD. If the AP is the temporary serving AP of the UD, then the allocated mRNTI is used for addressing the UD. Otherwise, the UD is addressed by the beam index and the UD ID or the UD-selected random number is included in the message to the UD. The serving AP also includes the mRNTI for the UD in the message (if this is not already allocated, then this AP does so after allocating one) to be used for subsequent communications. Upon receiving the Cluster Configuration Confirm message forwarded by the CSM, the AP may begin the communication with the UD using the RRC configuration, such as the DL control channel and the mRNTI allocated for the UD, and monitoring the uplink polling channel it has allocated for the UD for UL messages from the UD.

Figure 7C:
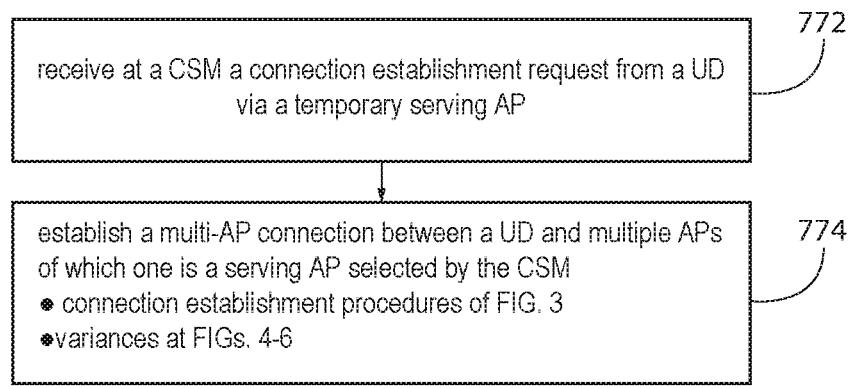

FIG. 7C is a flow diagram from the perspective of the CSM. At block 772 the CSM receives a connection establishment request from a UD via a temporary serving AP. Then at block 774 the CSM establishes a multi-AP connection between the UD and multiple APs of which one is a serving AP selected by the CSM, and as mentioned for FIG. 7A there are quite detailed examples above for exactly how this establishing might be implemented in various practical deployments.

For example, upon receiving the AP-list, the accessibility report and connection request from the temporary serving AP, the CSM does the following:
  a. It determines the cluster set (CS) for the UD from the AP-list and may select the serving AP if it already has the relevant network and system status/condition, such as current loads in the APs.
  b. It sends request for S1 connection setup and security configurations to MME. Simultaneously, it sends a RRC connection configuration request and also DL and UL control channel allocation and configuration request to each AP in CS; the CSM may also include a request for AP status information, such as current load condition.

Upon receiving the security configuration from the MME, the CSM can set up the security parameters, such as authentication and encryption keys, and send the Security Mode Command for the UD to the serving AP or to the temporary serving AP, depending on whether serving AP selection has been completed or not.

After receiving the AP configuration and status from all APs in the CS of the UD, the CSM:
  c. Re-selects a new serving AP, if necessary, based on the AP received status information.
  d. Sends the cluster configuration to the serving AP (for forwarding to the UD), which contains the following:
    i. RRC configuration, including the mRNTI and RLC parameters for each AP
    ii. DL and UL control channel allocations And finally, upon receiving the Cluster configuration Confirm message the CSM forwards it to the APs in the CS.

Each of FIGS. 7A-C themselves can be considered as an algorithm, and more generally represents steps of a method, and/or certain code segments of software stored on a computer readable memory or memory device that embody the respective FIG. 7A-C algorithm for implementing these teachings from the perspective of that respective device (UD, AP or CSM). In this regard the invention may be embodied as a non-transitory program storage device readable by a machine such as for example one or more processors of a UD, AP or CSM, where the storage device tangibly embodies a program of instructions executable by the machine for performing operations such as those shown at FIGS. 7A-C and detailed above.

Figure 8:
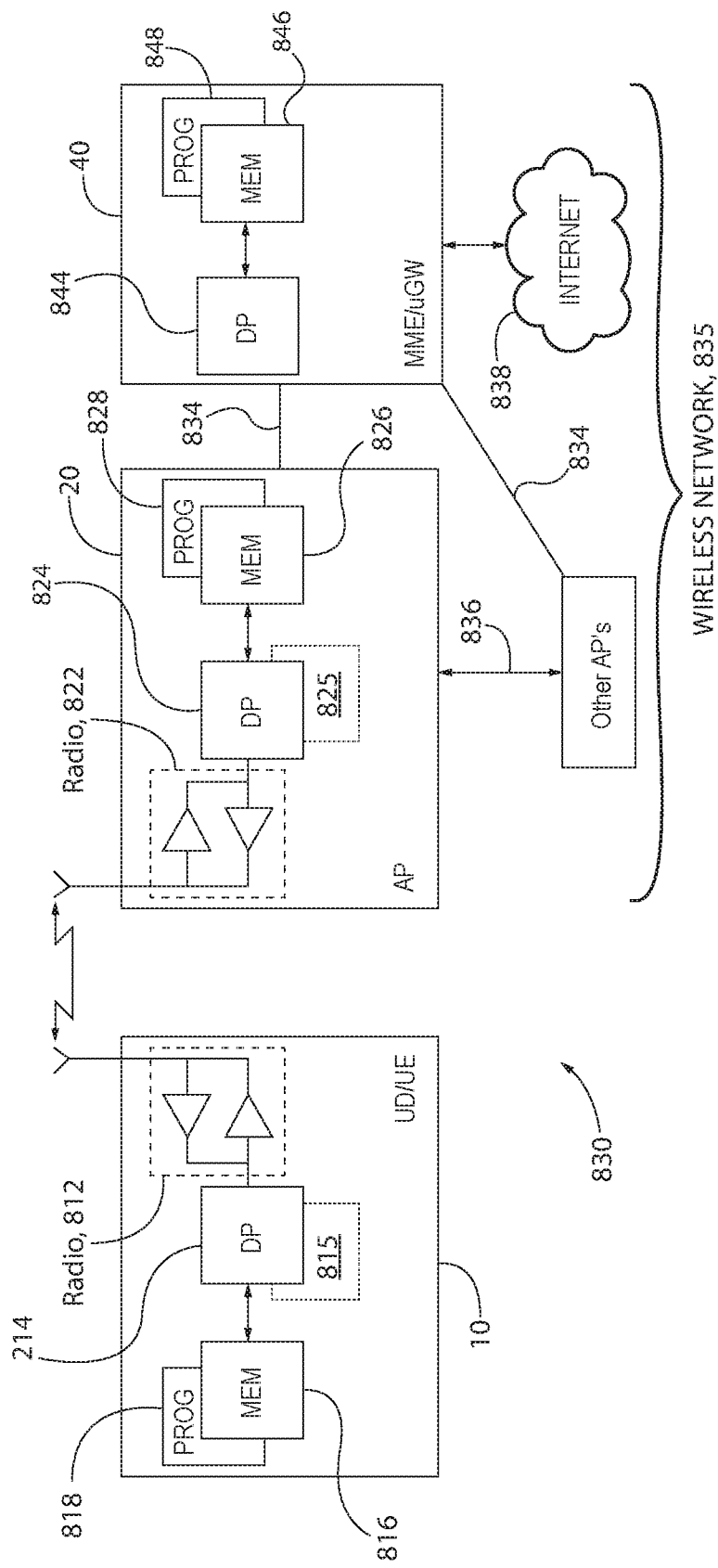
FIG. 8 is a diagram illustrating some components of the UD, AP and MME that are suitable for practicing various aspects of the invention.

FIG. 8 is a high level diagram illustrating some relevant components of various communication entities that may implement various portions of these teachings, including a network access node shown particularly as an AP 20, a mobility management entity MME which may also be co-located with a user-plane gateway uGW 40, and a user equipment (UE) 10. In the wireless system 830 of FIG. 8 a communications network 835 is adapted for communication over a wireless link 832 with an apparatus, such as a mobile communication device which may be referred to as a UD 10, via a network access node, such as an AP 20. The network 835 may include a MME/Serving-GW 40 that provides connectivity with other and/or broader networks such as a publicly switched telephone network and/or a data communications network (e.g., the internet 838).

The UD 10 includes a controller, such as a computer or a data processor (DP) 814 (or multiple ones of them), a computer-readable memory medium embodied as a memory (MEM) 816 (or more generally a non-transitory program storage device) that stores a program of computer instructions (PROG) 818, and a suitable wireless interface, such as radio frequency (RF) transceiver or more generically a radio 812, for bidirectional wireless communications with the AP 20 via one or more antennas. In general terms the UD 10 can be considered a machine that reads the MEM/non-transitory program storage device and that executes the computer program code or executable program of instructions stored thereon. While each entity of FIG. 8 is shown as having one MEM, in practice each may have multiple discrete memory devices and the relevant algorithm(s) and executable instructions/program code may be stored on one or across several such memories.

In general, the various embodiments of the UD 10 can include, but are not limited to, mobile user equipments, cellular telephones, smartphones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The AP 20 also includes a controller, such as a computer or a data processor (DP) 824 (or multiple ones of them), a computer-readable memory medium embodied as a memory (MEM) 826 that stores a program of computer instructions (PROG) 828, and a suitable wireless interface, such as a RF transceiver or radio 822, for communication with the UD 10 via one or more antennas. The AP 20 is coupled via a data/control path 834 to the MME 40. The path 834 may be implemented as an S1 interface. The AP 20 may also be coupled to other APs via data/control path 836, which may be implemented as an X5 interface.

The MME 840 includes a controller, such as a computer or a data processor (DP) 844 (or multiple ones of them), a computer-readable memory medium embodied as a memory (MEM) 846 that stores a program of computer instructions (PROG) 848.

At least one of the PROGs 818, 828 and 848 is assumed to include program instructions that, when executed by the associated one or more DPs, enable the device to operate in accordance with exemplary embodiments of this invention. That is, various exemplary embodiments of this invention may be implemented at least in part by computer software executable by the DP 814 of the UD 10; by the DP 824 of the AP 20; and/or by the DP 844 of the MME 40, or by hardware, or by a combination of software and hardware (and firmware).

For the purposes of describing various exemplary embodiments in accordance with this invention the UD 10 and the AP 20 may also include dedicated processors 815 and 825 respectively.

The computer readable MEMs 816, 826 and 846 may be of any memory device type suitable to the local technical environment and may be implemented using any suitable data storage technology, such as semiconductor based memory devices, flash memory, magnetic memory devices and systems, optical memory devices and systems, fixed memory and removable memory. The DPs 814, 824 and 844 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 812 and 822) may be of any type suitable to the local technical environment and may be implemented using any suitable communication technology such as individual transmitters, receivers, transceivers or a combination of such components.

A computer readable medium may be a computer readable signal medium or a non-transitory computer readable storage medium/memory. A non-transitory computer readable storage medium/memory does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium/memory would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

A communications system and/or a network node/base station may comprise a network node or other network elements implemented as a server, host or node operationally coupled to a remote radio head. At least some core functions may be carried out as software run in a server (which could be in the cloud) and implemented with network node functionalities in a similar fashion as much as possible (taking latency restrictions into consideration). This is called network virtualization. "Distribution of work" may be based on a division of operations to those which can be run in the cloud, and those which have to be run in the proximity for the sake of latency requirements. In macro cell/small cell networks, the "distribution of work" may also differ between a macro cell node and small cell nodes. Network virtualization may comprise the process of combining hardware and software network resources and network functionality into a single, software-based administrative entity, a virtual network. Network virtualization may involve platform virtualization, often combined with resource virtualization. Network virtualization may be categorized as either external, combining many networks, or parts of networks, into a virtual unit, or internal, providing network-like functionality to the software containers on a single system.

Below are some acronyms used herein:
AP Access point
AS Access Stratum
TDD Time division duplex
DL Downlink
CN Core Network
CS Cluster Set
CSM Cluster Set Manager
CSI Channel State Information
DTX Discontinuous Transmission
DRX Discontinuous Reception
IMSI International Mobile Subscriber Identity
LOS Line-OF Sight
MME Mobility management Entity
mmWave Millimeter wave
mRNTI mmWave-cell Radio Network Temporary Identifier
NAS Non-Access Stratum
RACH Random Access Channel
RAN Radio Access Network
RAR Random Access Response
RLC Radio Link Control
RRC Radio Resource Control
SINR Signal-to-Interference and Noise Ratio
S-TMSI SAE-Temporary Mobile Subscriber Identity
UD User Device
uGW user-plane gateway
UL Uplink

What is claimed is:

1. A method comprising:
   establishing a multi-access point connection between a user device and multiple access points of which one is a serving access point; and
   in response to interruption of the connection between the user device and the serving access point, the user device handing over to a different one of the multiple access points using the established multi-access point connection such that the different one of the multiple access points becomes a new serving access point,
   wherein establishing the multi-access point connection comprises:
   the user device sending to a temporary serving access point, on radio resources granted in reply to a resource request sent by the user device on the random access channel, a connection establishment request with a list of candidate access points for the multi-access point connection.

2. The method according to claim 1, further comprising:
   prior to sending the connection establishment request, the user device receiving synchronization and system information from a plurality of access points, and thereafter selecting the candidate access points for inclusion in the list of candidate access points and further selecting which of the candidate access points is to be the temporary serving access point.

3. The method according to any of claim 1, wherein
   the connection establishment request further includes, for each of the candidate access points: information identifying a best beam, an indication of channel quality and/or signal strength for the best beam, and a temporary downlink control channel monitoring configuration;

and the method further comprises, after sending the connection establishment request, the user device monitoring each of the candidate access points using the respective temporary downlink control channel monitoring configuration for a channel allocation addressed to the respective best beam.

4. The method according to any of claim 1, wherein connection establishment request includes a first request to establish a radio resource control connection and a second request to setup a connection between a radio access network and a core network that is identified in the second request.

5. The method according to any of claim 1, further comprising, after receiving a response from the temporary serving access point to the sent connection establishment request:
the user device monitoring a downlink control channel of the temporary serving access point using a mobile radio network temporary identity allocated to the user device via the response, and
the user device further monitoring a downlink control channel of each candidate access point other than the temporary serving access point using an index of the respective best beam reported by the user device in the connection establishment request.

6. The method according to any of claim 1, wherein establishing the multi-access point connection comprises the user device receiving a RRC Configuration message that configures the multi-access point connection and that includes security parameters therefore;
the method further comprising the user device determining which of the candidate access points is to be the serving access point for the multi-access point connection from the RRC Configuration message.

7. The method according to any of claim 1, wherein establishing the multi-access point connection comprises:
the user device receiving a cluster configuration message that identifies which of the candidate access points are members of the user device's cluster set of access points, and for each of said members a downlink control channel to monitor and an uplink control channel for polling messages and a temporary identifier for the downlink control channel, and
the user device monitoring control channels of each access point in the cluster set for messages addressed to a temporary identifier allocated to the user device by the respective access points in the cluster set.

8. A computer program product being tangibly stored on a non-transitory computer readable storage medium and including instructions which, when executed by at least one processor, cause an apparatus to perform at least the following:
establish a multi-access point connection between a user device and multiple access points of which one is a serving access point; and;
in response to interruption of the connection between the user device and the serving access point, hand over the user device to a different one of the multiple access points using the established multi-access point connection such that the different one of the multiple access points becomes a new serving access point,
wherein establishing the multi-access point connection comprises:
the user device sending to a temporary serving access point, on radio resources granted in reply to a resource request sent by the user device on the random access channel, a connection establishment request with a list of candidate access points for the multi-access point connection.

9. An apparatus comprising:
at least one processor and at least one memory storing a computer program, wherein the at least one processor is configured with the at least one memory and the computer program to cause the apparatus to perform actions comprising:
establish a multi-access point connection between a user device and multiple access points of which one is a serving access point; and;
in response to interruption of the connection between the user device and the serving access point, hand over the user device to a different one of the multiple access points using the established multi-access point connection such that the different one of the multiple access points becomes a new serving access point.

10. The apparatus according to claim 9, the actions further comprising:
prior to sending the connection establishment request, the user device receiving synchronization and system information from a plurality of access points, and thereafter selecting the candidate access points for inclusion in the list of candidate access points and further selecting which of the candidate access points is to be the temporary serving access point.

11. The apparatus according to any of claim 9, wherein the connection establishment request further includes, for each of the candidate access points: information identifying a best beam, an indication of channel quality and/or signal strength for the best beam, and a temporary downlink control channel monitoring configuration;
and the actions further comprise, after sending the connection establishment request, the user device monitoring each of the candidate access points using the respective temporary downlink control channel monitoring configuration for a channel allocation addressed to the respective best beam.

12. The apparatus according to any of claim 9, wherein connection establishment request includes a first request to establish a radio resource control connection and a second request to setup a connection between a radio access network and a core network that is identified in the second request.

13. The apparatus according to any of claim 9, the actions further comprising, after receiving a response from the temporary serving access point to the sent connection establishment request:
the user device monitoring a downlink control channel of the temporary serving access point using a mobile radio network temporary identity allocated to the user device via the response, and
the user device further monitoring a downlink control channel of each candidate access point other than the temporary serving access point using an index of the respective best beam reported by the user device in the connection establishment request.

14. The apparatus according to any of claim 9, wherein establishing the multi-access point connection comprises the user device receiving a RRC Configuration message that configures the multi-access point connection and that includes security parameters therefore;
the actions further comprising the user device determining which of the candidate access points is to be the serving access point for the multi-access point connection from the RRC Configuration message.

15. The apparatus according to any of claim 9, wherein establishing the multi-access point connection comprises:
    the user device receiving a cluster configuration message that identifies which of the candidate access points are members of the user device's cluster set of access points, and for each of said members a downlink control channel to monitor and an uplink control channel for polling messages and a temporary identifier for the downlink control channel, and
    the user device monitoring control channels of each access point in the cluster set for messages addressed to a temporary identifier allocated to the user device by the respective access points in the cluster set.

\* \* \* \* \*